Figure 1:
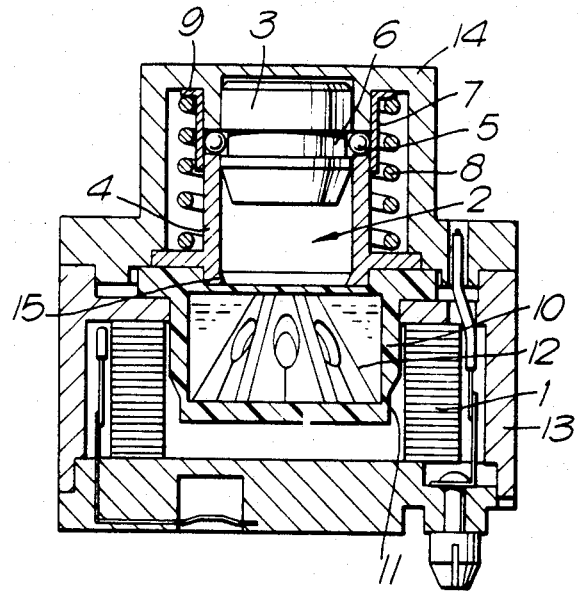

United States Patent [19]

Fairwood et al.

[11] Patent Number: 4,612,264
[45] Date of Patent: Sep. 16, 1986

[54] BATTERY INITIATOR SYSTEM

[75] Inventors: Raymond S. Fairwood, Blackburn; Bryan J. Weal, Darwen, both of England

[73] Assignee: The Secretary of State in Her Britannic Majesty's Government of the United Kingdom of Great Britain and Northern Ireland, London, England

[21] Appl. No.: 369,428

[22] Filed: Apr. 19, 1982

Related U.S. Application Data

[63] Continuation of Ser. No. 188,665, Sep. 19, 1980, abandoned.

[30] Foreign Application Priority Data

Sep. 24, 1979 [GB] United Kingdom ............... 7932971

[51] Int. Cl.4 .............................................. H01M 6/30
[52] U.S. Cl. ..................... 429/114; 429/116
[58] Field of Search ................... 429/114, 116, 110

[56] References Cited

U.S. PATENT DOCUMENTS 3,484,297 12/1969 Zaleski ............................. 429/116
3,785,872 1/1974 Zaleski ............................. 429/116

FOREIGN PATENT DOCUMENTS 2638645 3/1977 Fed. Rep. of Germany ...... 429/114

Primary Examiner—Anthony Skapars
Attorney, Agent, or Firm—Cushman, Darby & Cushman

[57] ABSTRACT

In a reserve battery initiator a unitary moulded ampoule (10) containing an electrolyte comprises two portions conjoined by a mechanically weak section (11). The ampoule (10) may be ruptured by a striker (3) which is released when the initiator is subjected to sufficient an accelerative force to overcome a detent mechanism. The ampoule may also contain an insert (12) to transmit to the weak section the force imparted by the striker. The insert (12) may additionally have a cutting effect on the weak section (11). Conveniently the insert is in the form of a frustrum with a narrow end contiguous with the inner face of the ampoule at the location where the striker (3) impacts and a wide end contiguous with the inner face of the weak section (11).

9 Claims, 2 Drawing Figures

BATTERY INITIATOR SYSTEM

This is a continuation of application Ser. No. 188,665, filed Sept. 19, 1980, now abandoned.

The present invention relates to a reserve battery initiation device which is designed to be triggered by acceleration of a reserve battery unit incorporating the device.

Reserve batteries are batteries which can be brought into operation as desired, usually by introduction of an electrolyte into the battery and which, until the time when such operation commences should remain highly stable and not suffer from deterioration. Reserve batteries commonly comprise a cell stack in which adjacent cells are separated by solid plates coated for example on one side with a layer of lead and on the other with a layer of lead dioxide. The plates are commonly of steel. To initiate operation of the battery an electrolyte is introduced into the cell stack and the electrolyte is usually one which produces soluble reaction products at the electrodes, eg perchloric or fluoroboric acid. This helps to prevent bridging of the plates in a cell which might occur if the reaction products were deposited as solid matter.

Some batteries intended for applications in which they are rapidly rotated while in use are formed with flat parallel bi-polar plates disposed in planes perpendicular to the axis of rotation. In one such known arrangement the plates are annular and the stack thus forms a cylinder with a coaxial cylindrical space therethrough in which space it is convenient to place the source of the electrolyte. Thus when the electrolyte is released it will be thrown outwards by the spinning motion of the whole unit and provision of apertures in the radially inner walls of each of the cells allows the electrolyte to enter the cells and to initiate operation of the battery.

The electrolyte is generally held in an ampoule which may be formed of plastics material or of a thin metal. Various systems have been devised to rupture the ampoule to initiate battery operation but all of these suffer from disadvantages for a variety of reasons. In particular when the ampoule is made of a thin material there is a danger of it being broken accidentally through rough handling of the battery/initiator unit, and to make the ampoule of metal (which must be one which will be almost completely resitant to chemical attack by the electrolyte) is relatively expensive in any event. For these reasons ampoules of inert plastics material, especially polyethylene, have been very widely used to contain the electrolyte for reserve batteries. These have generally been provided with a portion of wall which is considerably weaker than other portions of the ampoule wall so that the wall fractures preferentially thereat. Such weak sections have in the past been provided by machining away a portion of the ampoule wall to produce a mechanically weak section formed by a V-notch at which fracture is caused to occur by striking the ampoule against an anvil or by the effect of gas pressure generated by a rapidly-burning charge, ignited by a moving element housed in the initiator.

In these arrangements the movement required to break the ampoule or to cause it to be broken may be initiated by some independant action or may occur automatically as the result of an acceleration of the system, in which case the inertia of a part of the system which is free to move relative to the system as a whole is used to produce the desired relative movement. In this latter case the movement may be caused to commence only when a pre-determined rate of acceleration is exceeded over a predetermined period, suitable detent means being employed to prevent movement taking place until this has occurred.

This reduces the danger of an unwanted release of the electrolyte from the ampoule occurring as for example might otherwise happen if the battery/initiator unit were merely allowed to fall freely on to a surface which would cause it to experience a high deceleration but of almost instantaneous duration.

Ampoules with machined weak sections have proved to be not entirely satisfactory in operation. In particular it is very difficult to achieve consistent machining of the weak sections since the extent of machining is dependent on such variables as the nature of the plastics material, the skills and conscientiousness of the operative and the condition of the machining tools. Because of these factors the thinness of the ampoule walls at the weak section is in practice quite variable and as a result the performance of the ampoules under striking impact is not consistent. This means that for a batch of ampoules which are arranged to be struck with the same force and the weak sections of which have nominally the same strength, some will not in fact rupture due to under-machining of the weak section, while with others of the batch the maximum height from which they may be dropped without rupture may be less than that expected based upon the nominal (design) thickness of the weak section.

A further disadvantage of machined weak sections is that machining cuts through one of the skins of the ampoule moulding and thus removes one of the barriers to migration of the electrolyte thorugh the wall of the ampoule, the skins being more resistant to migration than the material betweeen them. Reserve battery systems are often by their very nature required to be kept awaiting use for long periods of time, eg many years in the case of a warning system energiser, and this reduced resistance to migration of the electrolyte can mean a loss of activity of the battery after long storage.

According to the present invention a reserve battery initiator comprises an ampoule for containing an electrolyte solution, said ampoule having two portions, conjoined by a mechanically weak section, one portion being moveable relative to the other upon rupture of the weak section to release the electrolyte solution from the ampoule, a striker mounted to impact with the said ampoule so as to rupture the ampoule at its mechanically weak section; and an insert being contiguous with the weak section which extends in a closed path and with the area of impact of the striker, said insert being arranged to transmit a force imparted by the striker from the said area of impact directly to the immediate region of the weak section to fracture said weak section at each point along said closed path.

Conveniently the two portions of the ampoule and the seak section are integrally moulded.

In one advantageous embodiment of the initiator of this invention the initiator includes detent means which restrain the striker and ampoule from coming together until the initiator is subjected to a predetermined acceleration for a predetermined period. In the latter event it can conveniently be arranged that, on release of the detent means either the ampoule or the striker will become freely movable relative to the other and, if the predetermined acceleration is sustained, the inertia of the released component causes the striker and ampoule to strike together with a sufficient force to cause rupture at the weak section.

It will be appreciated that the factors which govern the breaking strength of the ampoule are the acceleration to which it is to be subjected, the duration of this acceleration, and the masses of the respectively moveable parts of the initiator. It is desired to set the breaking strength at such a level that rupture will occur reliably at the design acceleration and duration with given masses but will not occur at accelerations and/or duration which are not greatly different from the design values. This is in order to allow as wide a safety margin as possible and particularly to guard against the possibility of inadvertant actuation of the device through its being dropped.

Typically, when the initiator is required to be actuated on being subject to an acceleration of 1600 g operative for a pierod of 1½–2 milliseconds a strker of weight 7 g travelling a distance of 0.4 inch will cause rupture of an ampoule made of polyethylene with a weak section of thickness 6 thousandths of an inch with high reliability. It has been found that thicknesses of up to 13 thousandths of an inch may be broken under such circumstances but not very reliably. Although it is desirable to have the weak section of the ampoule reasonably thick in order to reduce or if possible eliminate electrolyte migration losses through the walls of the ampoule to achieve this in general would require more massive strikers and ancillary parts and as weight in the intended applications is usually at a premium, it is generally undesirable to make these parts too heavy.

To ease this situation therefore it is useful to ensure that the accelerative force of the striker is imparted with the maximum efficiency to the ampoule weak section. This is achieved by incorporating within the ampoule a member designed to transfer the blow of the striker against one wall of the ampoule to the region of the weak section of the ampoule. It should be pointed out here that it will be more convenient to arrange that the striker strikes the ampoule at a location which is remote from the weak section so that it will not enter the area at which rupture has occurred and thus restrict or prevent the escape of the electrolyte. This sort of arrangement also makes possible rupture at the sides of the ampoule so that electrolyte can escape freely ifthe unit is spinning about the axis along which the accelerative force is operative. It is therefore particularly convenient to have the force transfer member in the form of a frustrum with the narrow end situated against the inner face of the ampoule with which the striker collides and the wide end situated against the inner face of the thin section of the ampoule. Even greater effectiveness is achieved by having slits extending up the frustrum from the wide end thereof, which allow the edges to splay outwardly when the ampoule and hence frustrum is struck by the striker. It is found that these edges will effectively cut into the walls of the ampoule at the thin section and in this way thin sections of up to double the thickness which would be ruptured under otherwise identical conditions can be broken.

The force transferring insert is conveniently made of an inert plastics material, as is the ampoule, eg the insert of ABS and the ampoule of polyethylene. Both the ampoule and the insert, may be moulded in any conventional manner for plastics moulded articles, methods for doing this being generally well known in the art. Alternatively these parts may be made from other materials eg metals, but the materials should be inert in the presence of the electrolyte solution over long periods of time (maybe up to 15 years). Also of course manufacturing ampoules with thin sections of metal would be more difficult than moulding equivalent articles from plastics materials and for these reasons and for reasons of expense it is much preferred to mould the ampoules from plastics materials.

The striker will generally be made of a metal such as stainless steel or a heavy alloy. In this way the sapce taken up by the part will be minimized, this often being an important consideration also with devices of this nature.

Figure 2:
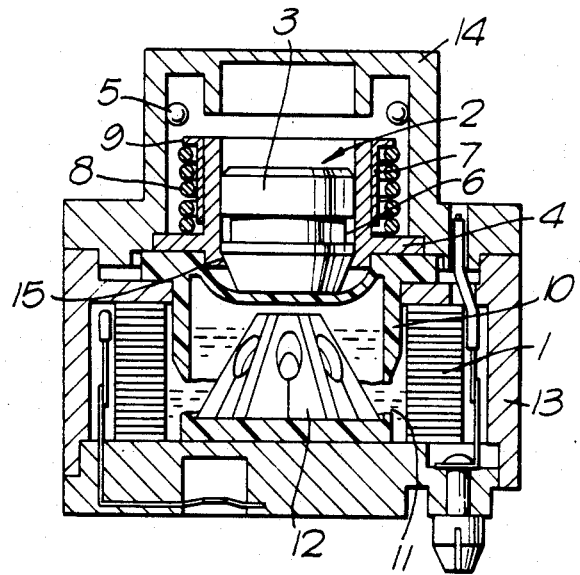

In order that the invention may be more fully comprehended an embodiment thereof will now be described, with particular reference to the accompanying drawings, in which:

FIG. 1 is a sectional elevation of a reserve battery/initiator unit with a releasable striker in its normal, unactivated, position; and FIG. 2 is a sectional elevation of the same unit when activated showing the position after rupture of the ampoule.

In FIG. 1 there are shown an annularly-disposed reserve battery comprising a cell stack 1 and as shown generally at 2, a battery initiator. These parts together comprise a reserve battery/initiator unit. The initiator 2 comprises a cylindrical striker 3 of stainless steel which is slideable within a tubular striker guide 4, also of stainless steel, upon release of steel retaining balls 5 forming part of a detent mechanism. The retaining balls 5 are accommodated in a groove 6 formed around the circumference of the striker 3 and are held there in the normal, "rest", position of the device by detent means comprising an annular sleeve 7 which is slideable along the outer face of the guide 4. Normally the sleeve 7 is restrained against movement by the detent spring 8 which bears against an annular flange 9 around the upper edge of the sleeve. Situated within the annular battery or cell-stack 1 is an ampoule 10 of moulded polyethylene and having moulded therein an annular weak section as shown at 11. The ampoule contains electrolyte and a rigid plastics insert 12 of frustroconical form designed to transmit a downward force acting on the top of the ampoule (in the sense of FIG. 1) into a downward force acting on the base of the ampoule. A plurality of slots extend longitudinally from the wide end of the insert 12.

The reserve battery 1 is arranged within a housing 13 and the various parts of the initiator device can be brought together before the whole system is sealed by closing with an initiator housing 14 which fits tightly to the battery housing 13.

The operation of the embodiment shown is as follows. If the battery/initiator unit is accelerated upwardly (in the sense of FIG. 1) at a sufficient rate and for a sufficient time, the inertia of the sleeve 7 will cause it to move downwardly relative to the remainder of the unit to release the balls 5 from the groove 6. The downward motion of the sleeve 7 is opposed by the spring 8, and the rate and period of acceleration necessary to release the balls 5 is thus determined by the spring characteristics and the mass and dimensions of the components.

On release of the balls 5, the striker is free to move within the sleeve 7 and upon sustained upward acceleration of the unit as a whole, will be caused as a result of its inertia to strike the ampoule 10. The force of this impact is transmitted to the base of the ampoule around its circumference by the insert 12. The weak section 11 of the ampoule is so designed having regard to the mass of the striker and the distance through which it must travel to strike the ampoule, that when the whole unit continues to be accelerated upwardly at the predetermined rate necessary to release the balls 5, the impact of the striker is sufficient to reliably cause fracture of the weak section. In a modification of the device the insert 12 has slits extending in from its large diameter edge (ie upwardly from the lower edge in FIG. 1) so that when the striker hits the ampoule the insert is caused to splay outwardly and this edge cuts into the ampoule thin section to either shear through it or at least to raise the stresses induced therein and thus to ease its fracture. With all other factors being kept the same this means that the thickness of the ampoule weak section can be increased whilst still obtaining reliable fracture thereof.

On fracture of the ampoule 10 the electrolyte is released to flow into the cell-stack 1 and the battery thus becomes operational. In the case of the embodiment of the invention illustrated it is intended that a spinning motion will be applied to the whole unit so that the electrolyte is then thrown outwardly into the annularly disposed battery and is held therein by centrifugal force.

To prevent damage to the cell stack and battery body the striker 3 is arrested before it enters the ampoule/cell stack space by an annular lip 15 formed around the bottom of the inner face of the striker guide 4.

It will be appreciated that in the operation of the initiator, electrolyte solution contained within the ampoule is released only when the whole unit is subjected to a predetermined rate and duration of upward acceleration. Because the weak section of the ampoule is moulded this acceleration can be predetermined with far greater accuracy than heretofore. This leads to greater certainty that the unit can be activated when required, together with a reduced risk of accidental activation.

We claim:

1. A reserve battery initiator comprising an ampoule for containing an electrolyte, said ampoule having two portions conjoined by a mechanically weak section extending in a closed path, one portion being moveable relative to the other upon rupture of the weak section to release the electrolyte from the ampoule; a striker; means for mounting said striker for movement to impact with the said ampoule so as to rupture the ampoule at its mechanically weak section; and an insert within the ampoule, said insert being contiguous with the weak section along said closed path and with the area of impact of the striker, said insert being arranged to transmit a force imparted by the striker from the said area of impact directly to the immediate region of the weak section to fracture said weak section at each point along said closed path.

2. A reserve battery initiator according to claim 1 wherein the insert is in the form of a frustrum with a narrow end contiguous with the inner face of the ampoule at the location where the striker can impact and a wide end contiguous with the inner face of the weak section.

3. A reserve battery initiator according to claim 1 wherein the insert has a cutting effect on the said weak section when it impacts with the striker.

4. A reserve battery initiator according to claim 1 whrein the insert has a plurality of slots extending longitudinally from the wide end thereof so that the edges splay outwardly when the ampoule impacts with the striker.

5. A reserve battery initiator according to claim 1 wherein the insert is formed from a plastics material which is inert in the presence of the electrolyte.

6. A reserve battery initiator according to claim 1 wherein the ampoule is formed from a plastics material which is inert in the presence of the electrolyte.

7. A reserve battery initiator according to claim 1 incuding detent means for restraining the striker and ampoule from coming together until the initiator is subjected to a predetermined acceleration for a predetermined time.

8. A reserve battery initiator according to claim 7 wherein the detent means comprises a resiliently biased member and at least one detent member, the resiliently biased member normally holding each detent member in a locking position in which it prevents contact between the striker and the ampoule and being moveable against its resilient bias on acceleration of the initiator of a predetermined magnitude and duration to release each detent member from its locking position so that the striker and the ampoule can impact together.

9. A reserve battery initiator according to claim 1, wherein the said two portions of ampoule and the weak section are integrally moulded.

* * * * *

UNITED STATES PATENT AND TRADEMARK OFFICE
CERTIFICATE OF CORRECTION

PATENT NO. : 4,612,264
DATED : September 16, 1986
INVENTOR(S) : Raymond S. Fairwood It is certified that error appears in the above-identified patent and that said Letters Patent is hereby corrected as shown below:

On the title page the Assignee should read

-- The Secretary of State for Defence in her Britannic Majesty's Government of the United Kingdom of Great Britain and Northern Ireland, Whitehall, London, England --.

Signed and Sealed this

Twenty-eighth Day of April, 1987

*Attest:*

DONALD J. QUIGG

*Attesting Officer*     *Commissioner of Patents and Trademarks*